(12) United States Patent
Zhang et al.

(10) Patent No.: US 12,384,101 B2
(45) Date of Patent: Aug. 12, 2025

(54) FACILITATING CONTROLLED MOLECULAR ASSEMBLY OF NANOSCALE STRUCTURES VIA DYNAMIC CONFINEMENT OF SOLVENT

(71) Applicants: The Regents of the University of California, Oakland, CA (US); IBM Almaden Research Center, San Jose, CA (US)

(72) Inventors: Jiali Zhang, Davis, CA (US); Victoria A. Puinova, San Jose, CA (US); Yang Liu, Davis, CA (US); Jane Frommer, San Jose, CA (US); Gang-Yu Liu, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 261 days.

(21) Appl. No.: 17/766,495

(22) PCT Filed: Oct. 6, 2020

(86) PCT No.: PCT/US2020/054434
§ 371 (c)(1),
(2) Date: Apr. 4, 2022

(87) PCT Pub. No.: WO2021/071857
PCT Pub. Date: Apr. 15, 2021

(65) Prior Publication Data
US 2024/0051218 A1 Feb. 15, 2024

Related U.S. Application Data

(60) Provisional application No. 62/911,780, filed on Oct. 7, 2019.

(51) Int. Cl.
*B29C 64/112* (2017.01)
*B29C 64/209* (2017.01)
(Continued)

(52) U.S. Cl.
CPC .......... *B29C 64/112* (2017.08); *B29C 64/209* (2017.08); *B29C 64/393* (2017.08);
(Continued)

(58) Field of Classification Search
CPC ... B29C 64/112; B29C 64/209; B29C 64/393; B33Y 10/00; B33Y 30/00; B33Y 50/02;
(Continued)

(56) References Cited

U.S. PATENT DOCUMENTS 10,751,933 B2 * 8/2020 Liu .................... B29C 67/00
2007/0094926 A1   5/2007 Branson et al.
(Continued)

FOREIGN PATENT DOCUMENTS

CN   105036052 A  * 11/2015
CN   108025487 A  *  5/2018  ............. A61L 27/00
JP   2005061859 A *  3/2005

OTHER PUBLICATIONS

Helfricht, et. al., "Writing with Fluid: Structuring Hydrogels with Micrometer Precision by AFM in Combination with Nanofluidics," Advanced Science News, 13, 1700962 (Year: 2017).*
(Continued)

*Primary Examiner* — David E Smith
*Assistant Examiner* — Laura Eloise Tandy
(74) *Attorney, Agent, or Firm* — Park, Vaughan, Fleming & Dowler LLP

(57) ABSTRACT

The disclosed embodiments provide a system that performs molecular assembly. During operation, the system delivers one or more droplets of a fluid onto a surface using a nanofluidic delivery probe and an associated high-precision positioning device, wherein the solution comprises a solvent and one or more solute molecules, and wherein delivery of the droplets onto the surface facilitates evaporation-driven assembly of one or more structures on the surface. More-
(Continued)

over, while delivering a droplet onto the surface, the system controls a size of the droplet and a shape of the droplet during evaporation to produce a variety of shapes in resulting structures.

27 Claims, 9 Drawing Sheets

(51) Int. Cl.
| | |
|---|---|
| *B29C 64/393* | (2017.01) |
| *B33Y 10/00* | (2015.01) |
| *B33Y 30/00* | (2015.01) |
| *B33Y 50/02* | (2015.01) |
| *B33Y 70/00* | (2020.01) |
| *B82B 3/00* | (2006.01) |
| *B29K 33/00* | (2006.01) |
| *B29K 105/00* | (2006.01) |

(52) U.S. Cl.
CPC ............... *B33Y 10/00* (2014.12); *B33Y 30/00* (2014.12); *B33Y 50/02* (2014.12); *B33Y 70/00* (2014.12); *B82B 3/0004* (2013.01); *B82B 3/0014* (2013.01); *B29K 2033/08* (2013.01); *B29K 2105/0073* (2013.01)

(58) Field of Classification Search
CPC ..... B33Y 70/00; B82B 3/0004; B82B 3/0014; B82B 3/0047; B29K 2033/08; B29K 2105/0073

See application file for complete search history.

(56) References Cited

U.S. PATENT DOCUMENTS

| | | | |
|---|---|---|---|
| 2008/0045728 | A1 | 2/2008 | Kruper et al. |
| 2008/0204513 | A1 | 8/2008 | Sekiya |
| 2009/0283751 | A1* | 11/2009 | Yang ............... B82Y 10/00 204/601 |
| 2011/0056575 | A1* | 3/2011 | Hong ................ F16K 99/0059 137/602 |
| 2012/0330044 | A1 | 12/2012 | Hou |
| 2013/0078469 | A1 | 3/2013 | Winter et al. |
| 2016/0033869 | A1 | 2/2016 | Hustad et al. |
| 2019/0210881 | A1* | 7/2019 | Tung ................ H01L 21/02617 |

OTHER PUBLICATIONS

English Translation of Matsumuro (Year: 2005).*
Helfricht (Year: 2017).*
Translation of Dong, et. al. (Year: 2015).*
Translation of Takahashi (Year: 2018).*

* cited by examiner

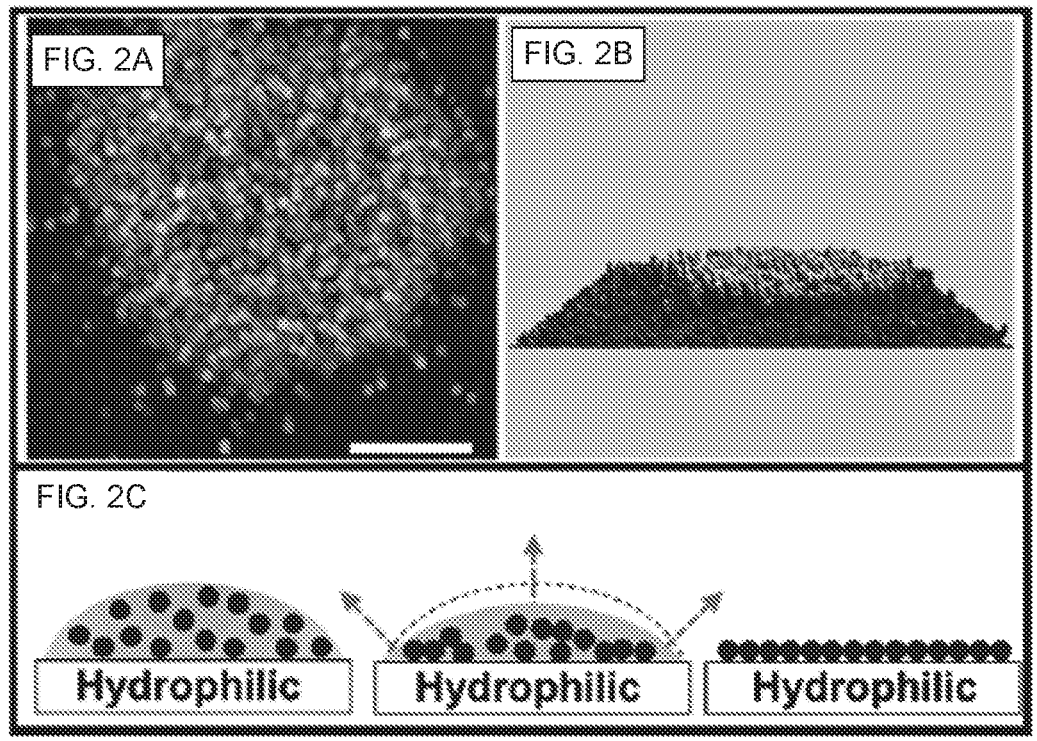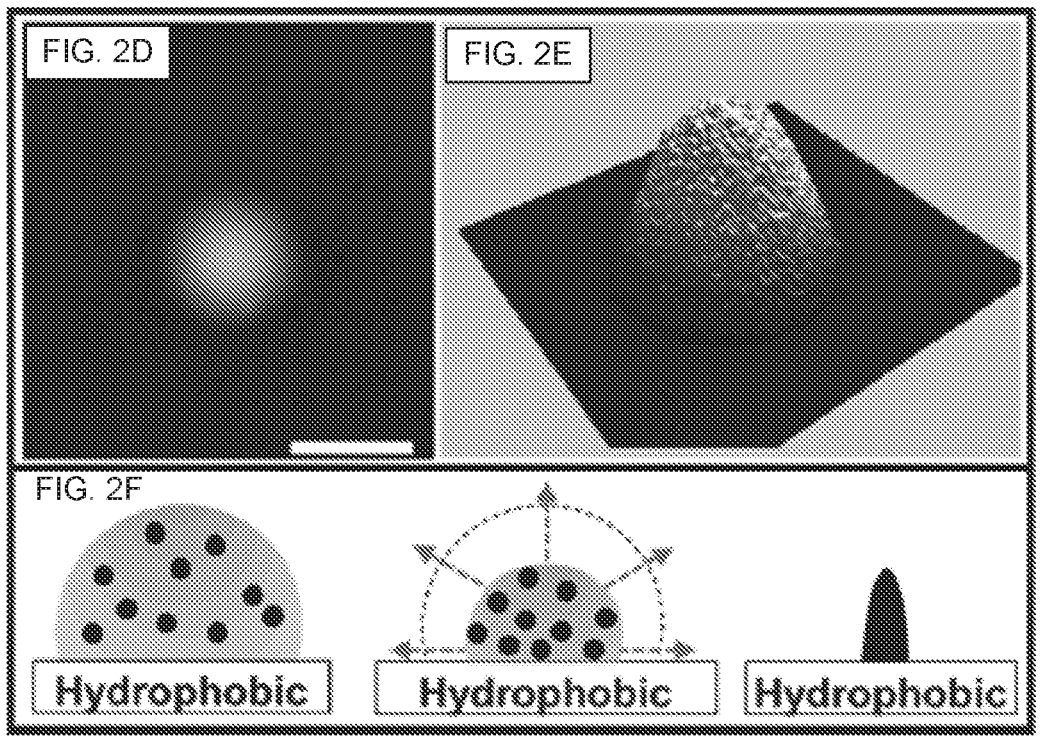

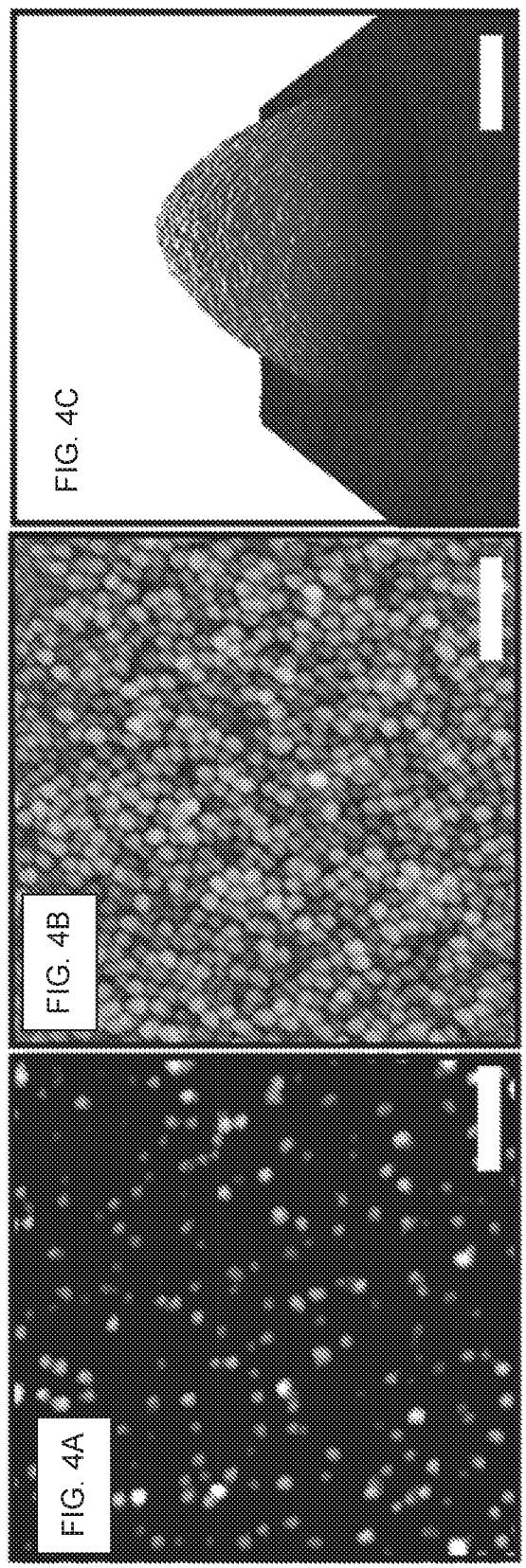

FACILITATING CONTROLLED MOLECULAR ASSEMBLY OF NANOSCALE STRUCTURES VIA DYNAMIC CONFINEMENT OF SOLVENT

RELATED APPLICATION

This application claims priority under 35 U.S.C. § 119 to U.S. Provisional Application No. 62/911,780, entitled "Controlled Molecular Assembly via Dynamic Confinement of Solvent" by inventors Jiali Zhang, Yang Liu and Gang-yu Liu, filed on 7 Oct. 2019, the contents of which are incorporated by reference herein.

GOVERNMENT LICENSE RIGHTS

This invention was made with U.S. government support under grant number CHE-1808829 awarded by the National Science Foundation (NSF). The U.S. government has certain rights in the invention.

BACKGROUND

Field

The disclosed embodiments generally relate to techniques for performing molecular assembly. More specifically, the disclosed embodiments relate to a new nanofluidic technique for performing controlled molecular assembly, which is able to produce a wide range of differently shaped nanoscale structures by controlling droplet shape and size.

Related Art

In recent years, researchers have developed techniques for performing molecular assembly of mesoscale structures by design. One promising technique called "self-assembly" operates by organizing various components, such as molecules, into ordered functional structures as a consequence of specific, local interactions among the components themselves, without external direction. For example, thermodynamic forces can be used to drive local interactions to produce various structures, such as self-assembled monolayers, phase-separated polymers, and lipid bilayers. However, the shapes of such structures produced using self-assembly are limited because of the reliance on purely local interactions. For example, it is extremely hard if not impossible to produce complex structures, and structures with asymmetric features.

Hence, what is needed is a technique for performing molecular assembly without the limitations of existing techniques, such as self-assembly.

SUMMARY

The disclosed embodiments provide a system that performs molecular assembly. During operation, the system delivers one or more droplets of a fluid onto a surface using a nanofluidic delivery probe and an associated high-precision positioning device, wherein the solution comprises a solvent and one or more solute molecules, and wherein delivery of the droplets onto the surface facilitates evaporation-driven assembly of one or more structures on the surface. Moreover, while delivering a droplet onto the surface, the system controls a size of the droplet and a shape of the droplet during evaporation to produce a variety of shapes in resulting structures.

In some embodiments, the one or more droplets comprise sub-femtoliter droplets.

In some embodiments, while controlling the shape of the droplet, the system controls one more of the following during the droplet-delivery process: a location of the delivery probe with respect to a middle of the droplet; a contact time for the delivery probe in the droplet; and a speed at which the delivery probe is withdrawn from the droplet.

In some embodiments, while controlling the size and the shape of the droplet, the system also controls one or more of the following: a contact angle for the droplet; a delivery pressure for the droplet; a delivery time for the droplet; an evaporation time for the droplet; a surface functionality of the surface; a surface functionality of the delivery probe; a contact force for the delivery probe; a concentration of the solute; an ambient humidity; and an ambient temperature.

In some embodiments, while delivering the one or more droplets, the system performs a three-dimensional (3D) nanoprinting process, wherein the solution is dispensed layer-by-layer following designed trajectories for each layer to form one or more three-dimensional structures.

In some embodiments, the nanofluidic delivery probe is part of a two-dimensional array of nanofluidic delivery probes, which can perform molecular assembly operations in parallel.

In some embodiments, the nanofluidic delivery probe is connected to a reservoir containing the solution, and a pressure-control mechanism.

In some embodiments, the nanofluidic delivery probe has an opening diameter from 5 nm to 10 μm.

In some embodiments, the solute is comprised of one or more polymers, including a star polymer [(polystyrene)$_{34}$-(poly(N,N-dimethylaminoethylmethacrylate)$_{40}$]$_{39}$, and the solvent is a mixture of water, ethanol, and glycerol.

In some embodiments, the solution includes one or more of the following: polyelectrolytes, organic molecules, inorganic molecules, and nanoparticles having a diameter from 1-100 nm.

In some embodiments, the surface is a solventphilic surface.

In some embodiments, the surface is a solventphobic surface.

In some embodiments, the one or more structures include one or more of the following: a disc; a multi-layer disc; a mound; an asymmetric hollow structure; a symmetric hollow structure; and a structure with a designed geometry.

In some embodiments, the one or more structures are 10 μm or smaller.

BRIEF DESCRIPTION OF THE FIGURES

FIG. 2A presents an AFM topographic image of a disk of star-shaped polymers formed on a hydrophilic AAPTMS/glass surface in accordance with the disclosed embodiments.

FIG. 2B presents a 3D display of the image in FIG. 2A in accordance with the disclosed embodiments.

FIG. 2C illustrates the assembly of star polymers under constant-contact-area evaporation in accordance with the disclosed embodiments.

FIG. 2D presents an AFM topographic image of a mound of star-shaped polymers formed on a hydrophobic OTS/glass surface in accordance with the disclosed embodiments.

FIG. 2E presents a 3D display of the image in FIG. 2D in accordance with the disclosed embodiments.

FIG. 2F illustrates the assembly of star polymers under constant-contact-angle evaporation in accordance with the disclosed embodiments.

FIG. 4A presents an AFM topographic image of randomly distributed star polymers at sub-monolayer coverage in accordance with the disclosed embodiments.

FIG. 4B presents an AFM topographic image of a monolayer disk of closely packed star molecules in accordance with the disclosed embodiments.

FIG. 4C presents an AFM topographic image of a mound of interdigitated star polymers in accordance with the disclosed embodiments.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

DISCUSSION

Figure 1:
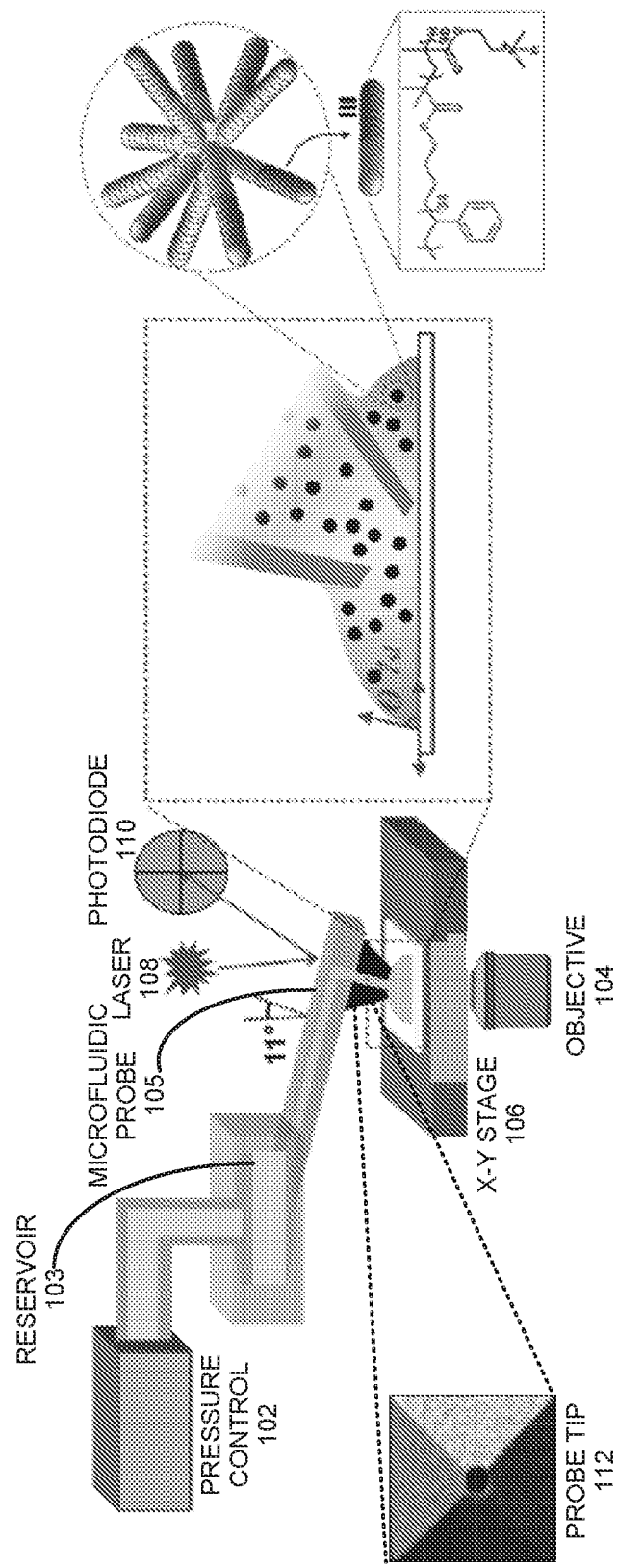
FIG. 1 illustrates an atomic force microscope (AFM) with an associated nanofluidic delivery probe in accordance with the disclosed embodiments.

The disclosed embodiments facilitate delivery of ultrasmall droplets using an independent microfluidic probe 105 on an atomic force microscopy (AFM) x-y stage 106 as is illustrated in FIG. 1. As illustrated in FIG. 1, a pressure control module 102 connects to a reservoir 103 of the probe, which stores a solution containing designed molecules with different design concentrations. The system can apply different pressures to get the solution to flow through the aperture of the probe onto a substrate located on x-y stage 106. Note that the laser 108 and photodiode 110 are used to control the contact pressure of microfluidic probe 105 by measuring bending of the probe. The middle of FIG. 1 presents an enlarged view of probe-surface contact with a contact angle θ. Also, the bottom left of FIG. 1 presents a micrograph of an exemplary probe tip 112 with a 300 nm aperture behind which the delivery pressure ranges from −800 to 1000 mbar. Note that this aperture size can be customized from several nanometers to micrometers.

By varying both contact time and surface functionality, the system illustrated in FIG. 1 can deliver aqueous droplets as small as 0.4 attoliter (aL), which is an order of magnitude smaller than previously recorded. To test solute assembly upon delivery of a small liquid droplet, we selected solute molecules with insignificant to repulsive intermolecular interactions in the solution so that assembly was primarily solvent-driven. Star polymers meet the criteria, with a nanogel core and amphiphilic arms emanating from the cross-linked hydrophobic core. The structure of a representative star polymer, star [(polystyrene)$_{34}$-(poly(N,N-dimethylaminoethylmethacrylate)$_{40}$]$_{39}$, abbreviated as star [PS$_{34}$PDMAEA$_{40}$]$_{39}$, is depicted in the right-hand side of FIG. 1. In aqueous solution and at pH 6.5 (ambient), the arms of the star polymer are positively charged, due to protonation of amine residues, hence assume an extended conformation. When forcing two polymer molecules closer, net electrostatic interaction is repulsive and overall entropy decreases, and it becomes thermodynamically unfavorable, which is referred to as "entropic repulsion" or "electrostatic repulsion," thereby preventing polymers from aggregating. In fact, the star [PS$_{34}$-PDMAEMA$_{40}$]$_{39}$ remained stable in aqueous solution for months under concentrations ranging from $2 \times 10^{-6}$ to $3 \times 10^{-5}$ M.

The shape of the droplet is determined by surface hydrophilicity. FIG. 2 compares the outcomes of star polymer assembly on hydrophilic vs. hydrophobic surfaces on delivery of droplets of sub-femto-liter (fL) volume. The aqueous solution was made by mixing ethanol:glycerol:H$_2$O=5:10:85

(v:v:v) and star [PS$_{34}$-PDMAEMA$_{40}$]$_{39}$ into 1.305×10$^{-5}$ M. Hydrophilic surfaces used were glass surfaces modified by N-(6-aminohexyl)-aminopropyltrimethoxysilane (AAPTMS) self-assembled monolayers. The solution contact angle on this SAM measured 53°, and was thus hydrophilic or "solution-philic." Upon delivery of 170 aL solution (p=50 mbar, t=1.08 s, and a contact force of 75 nN) and allowing ambient evaporation, the star polymers assembled into a disk 1.58±0.15 μm in diameter and 5.5±1.5 nm in height (FIG. 2A). The molecules within the disk exhibit homogeneous distribution, with individual molecules clearly visible in an AFM topography image. The star-star nearest neighbor separation is measured around 39±5 nm (FIG. 2B). This outcome of star-polymer assembly is consistent with "constant contact area evaporation," where upon delivery, sub-pL liquid quickly spread and evaporated on a "solution-philic" surface covering a constant contact area (diameter 1.58 μm), as shown in FIG. 2C. At 1.305×10$^{-5}$ M concentration, (1.38±0.12)×10$^3$ star polymers assembled into a monolayer within the circle with nearest neighbor separation of 39 nm. The result shown in FIG. 2A has been repeated 36 times (6×6 arrays); both robustness and versatility have been demonstrated by forming disks with diameters ranging from 0.7 to 7.1 μm by varying delivery t and p. These observations demonstrate molecular level control over the outcome of star polymer assembly, e.g. disk diameter and molecular packing within a disk, by pre-designed initial conditions, such as p, t, contact angle, and solution concentration.

On hydrophobic substrates, such as glass surfaces derivatized with octadecyltrichlorosilane (OTS) SAMs, the same star polymer solution exhibited a contact angle of 97°, which is considered solution-phobic. Upon delivery of 90 aL of the solution and allowing evaporation under ambient conditions, the star polymers assembled into a mound: 90.4±1.5 nm tall and 0.636±0.008 m diameter at the base (FIGS. 2D and 2E). This height is equivalent to 15 star-polymer layers from PE deposition. Though substructure is clearly seen on the outer surface of the mound, individual star polymers are not recognizable in FIG. 2E. The assembly into a mound shape is rationalized by the process of "constant contact angle evaporation," as illustrated in FIG. 2F. The initial droplet beaded up on OTS surface to a shape reminiscent of a spherical cap, in contrast to the spreading on AAPTMS SAMs. The ultrafast and near constant angle evaporation manifested as a shrinkage of the droplet, until all solute molecules assembled into a smaller solid spherical cap. At the concentration of 1.305×10$^{-5}$ M, the outcome is the mound observed in FIG. 2E.

It may seem counterintuitive at first glance that positively charged star polymer molecules piled into a mound. From an energetic perspective, solvent evaporation increased the overall entropy of the system, thus overcoming the electrostatic repulsion among solute molecules. The power of line tension is precedented in the context of maintaining the contact angle during evaporation to produce mound-like features at the micro- and millimeter scales. In our case, as the droplet was smaller and evaporation occurred faster than microscopic deposition, the star-polymer separation decreased rapidly under evaporation. The lack of independent individual star polymers in FIG. 2E is consistent with interdigitation among polymer arms within the mound.

These observations have been reproduced 121 times (11×11 array of mounds). The robustness and versatility have been demonstrated by forming spherical caps ranging in height from 20 to 200 nm by varying delivery t and p. These suggest that one could attain a high degree of control over star polymer assembly by pre-designed initial conditions such as p, t, contact angle and concentration. From our time-dependent AFM imaging, all assembled structures exhibit high integrity and stability throughout the duration of our experiment, five months.

Figure 3A:
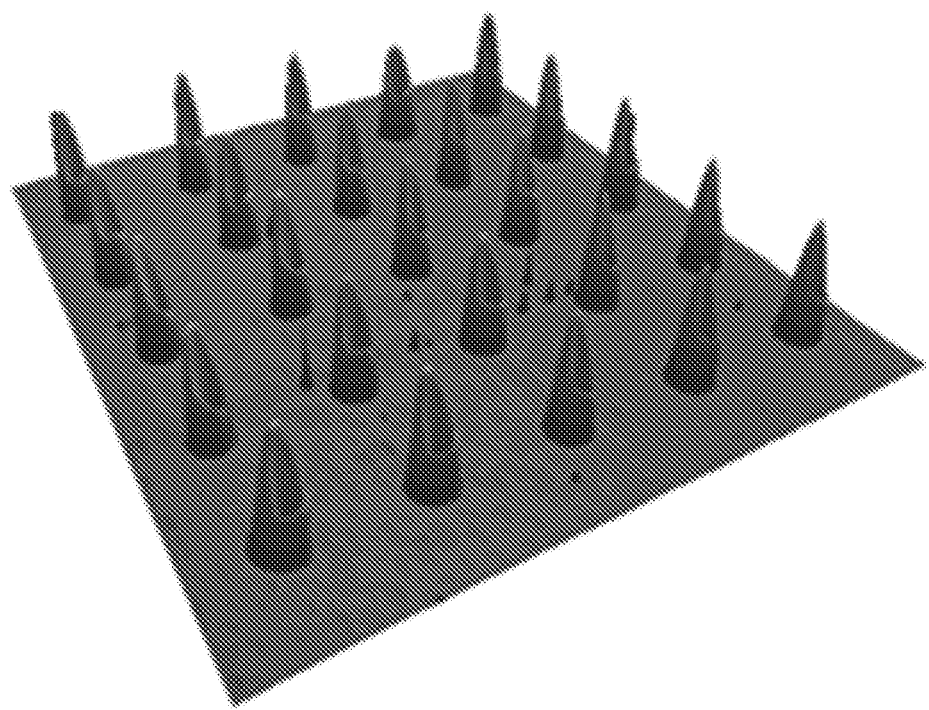
FIG. 3A presents an AFM topographic image showing a 5×5 array of star polymer assemblies in accordance with the disclosed embodiments.
Figure 3B:
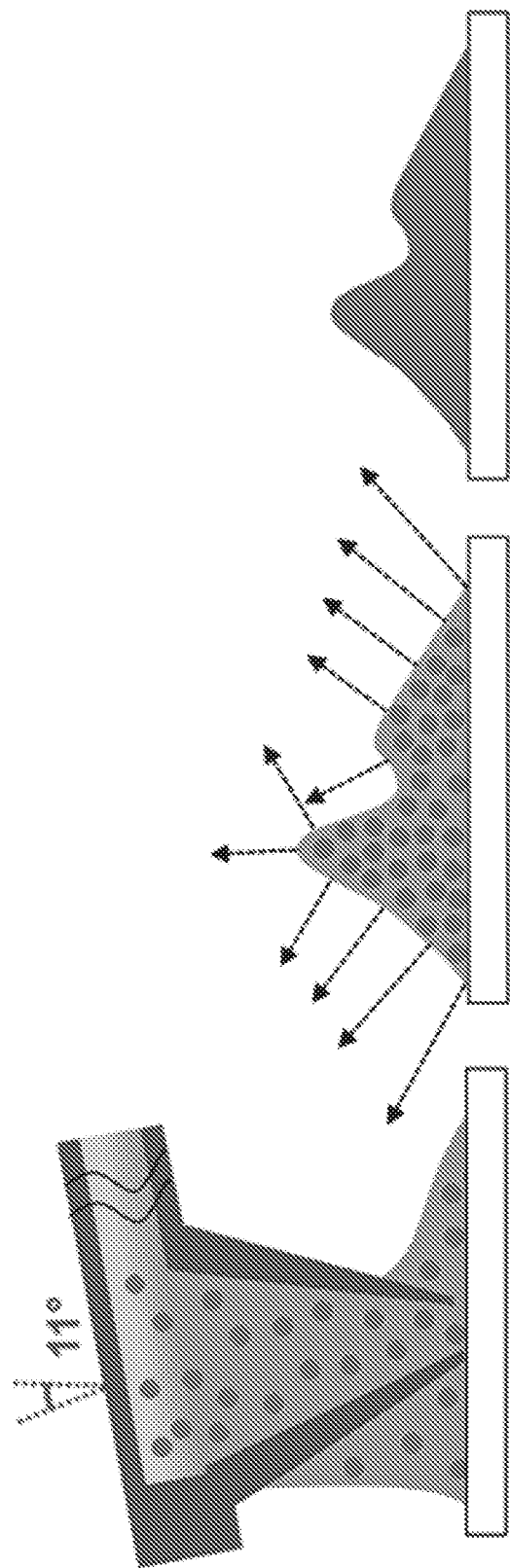
FIG. 3B illustrates the controlled assembly process: during dispensing, immediately after probe withdrawal and then the final assembly after solvent evaporation in accordance with the disclosed embodiments. The broken line represents the initial droplet boundary; the array of arrows represents evaporation direction and rate.

To further demonstrate the concept of "controlled assembly," more complex geometries than simple disks and mounds have been produced, again by well-designed initial conditions. FIG. 3A shows a 5×5 array of "cut-bamboo" or "bean-bag-chair" shaped features. Each feature was produced by dispensing 9.0 fL of star polymer solution on a freshly cleaned glass surface. The delivery conditions: t=0.5 s, p=700 mbar with a contact force of 90 nN. The solution contained 2.61×10$^{-5}$ M star [PS$_{34}$-PDMAEMA$_{40}$]$_{39}$ in a mixed solvent of ethanol:H$_2$O=1:9 (v:v). Clean glass surfaces were highly "solution-philic" (contact angle <10°). Dynamic light scattering measured the star polymer diameter of 33.5 nm, i.e., stable without aggregation. This solvent exhibited a higher evaporation rate than with previous experiments whose solvents contained a minute amount of glycerol. Each of the asymmetric features in FIG. 3A had a base diameter of 3.61±0.19 μm with an interior diameter of 1.10±0.15 μm. The tall and short wedges were 88.9±1.8 nm and 39.7±2.1 nm in height, respectively, with 1.92±0.11 μm separation. The saddle point measured 12.3±1.7 nm above the surface. The formation of the asymmetric geometry is rationalized in FIG. 3B. The probe is tilted 110 from surface normal. As such, the liquid spread and accumulated around the silica exterior walls of the probe during delivery, forming an asymmetric droplet. Due to the high evaporation rate of the solvent, evaporation occurred immediately during delivery and upon withdrawal of the delivery probe. In contrast to the previous cases, where the liquid droplet relaxed to a spherical cap after dispensing (e.g., short and flat cap on hydrophilic surfaces, and tall and narrow cap on hydrophobic surfaces), the fast evaporation worked against surface tension and hindered the relaxation of this droplet. As a result, the star polymer assembled itself following approximately the initial geometry of the droplet wrapped around the tip, resulting in the asymmetric features. At high star polymer concentrations and ultrasmall droplets, the initial geometry dominated, thus the 1.92 m separation as illustrated in FIG. 3B. The results are reproducible, as 37 bamboo features were produced consistently in two separate experiments. The robustness was also verified as the size and degree of asymmetry could be tuned by varying the volume of solutions, e.g., volcano-shaped features were produced under shorter time and lower pressure, FIG. 6B. These observations demonstrate the impact of initial droplet geometry on the final feature geometry, which enables production of custom-designed geometry via programming initial droplet geometry, e.g. by custom-designed probes, or tip-moving.

Control over the molecular packing within each feature was also achieved, as exemplified in FIG. 4. Under the conditions of low concentration (e.g., 2.61×10$^{-6}$ M star polymer in an EtOH:glycerol:H$_2$O=1:10:89 solution) and high degree of spreading (on AAPTMS/glass surfaces), 0.81 fL droplet (p=50 mbar, t=1.33 s) yielded randomly distributed star polymers at sub-monolayer coverage (22.6%). The nearest neighbor (NN) separation measured 90±25 nm, twice as large as their hydrated diameter (47 nm) as shown in FIG. 4A. To create closely packed structures with monolayer coverage, dense star polymers that densely cover the liquid-solid interface are required. Deposition of 1.78 fL star polymer solution (1.305×10$^{-5}$ M) under 200 mbar, 1.08 s onto AAPTMS/glass surfaces met these criteria, where the NN separation measured 37±4 nm (FIG. 4B). Bilayer and trilayer disks with closely packed star polymers could also be produced with increasing concentration. To force interdigitation among star polymers, "solution-phobic" surfaces are paired with a high concentration of solute (FIG. 4C). In contrast, conventional PE deposition only resulted in a single layer deposition, with nearest neighbor separation of 31±5 nm (FIG. 4D), similar to that of FIG. 4B. In sum, our results demonstrate the feasibility of controlling molecular level assembly within the feature trajectory.

Assembly of solute from ultrasmall droplets follows a different dynamic from that of larger scales. Using an independently controlled microfluidic probe in an atomic force microscope, this work reports our investigations into much reduced volumes, e.g. fL or smaller, using aqueous droplets containing positively charged star $[PS_{34}\text{-PD-MAEMA}_{40}]_{39}$. The results indicate that factors governing the assembly significantly differ from those of larger droplets, as ultrasmall droplets exhibit ultrafast evaporation, and as such the initial droplet geometry and concentration of solute play a dominant role in dictating the final assembly of solute molecules. The feature geometry could be controlled by varying the initial droplet shapes, to produce simple features such as disks and mounds, and even asymmetric geometries. The control over the molecular packing within the features is also demonstrated, ranging from randomly distributed star polymers in a sub-monolayer, densely packed monolayers and bilayers disks, and interdigitated packing in mounds. Since controlling initial droplet and solute distribution is much more achievable and programmable, this work represents a new paradigm to control the assembly of molecules. The concepts pave the way for promising applications, including 3D nanoprinting, programmable chemistry and materials science.

Techniques for Controlling Droplet Shape

A number of factors can be used to control the shape of a droplet. We can place a small object, such as the delivery probe, into the droplet during the evaporation process to affect the shape of the droplet during evaporation. In doing so, we can control: (1) a location of the delivery probe with respect to a middle of the droplet, which affects the symmetry of the droplet; (2) a contact time for the delivery probe in the droplet; and (3) a speed at which the delivery probe is withdrawn from the droplet. We can also vary the object's surface functionality to be more solventphilic or solvent-phobic. If you make the object solventphilic, the droplet will climb up the object. In contrast, making the object solvent-phobic, causes the liquid in the droplet to be repelled by the object. We can also change the chemicals in the droplet, which for example can change evaporation time.

Note that controlling liquid shape at larger scales is hard. For larger droplets, surface tension takes over. Hence, previous techniques for evaporation-driven assembly have not investigated controlling droplet shape during evaporation because these previous techniques used much larger-scale droplets for which surface-tension-related forces severely restrict control over droplet shape.

Figure 5A:
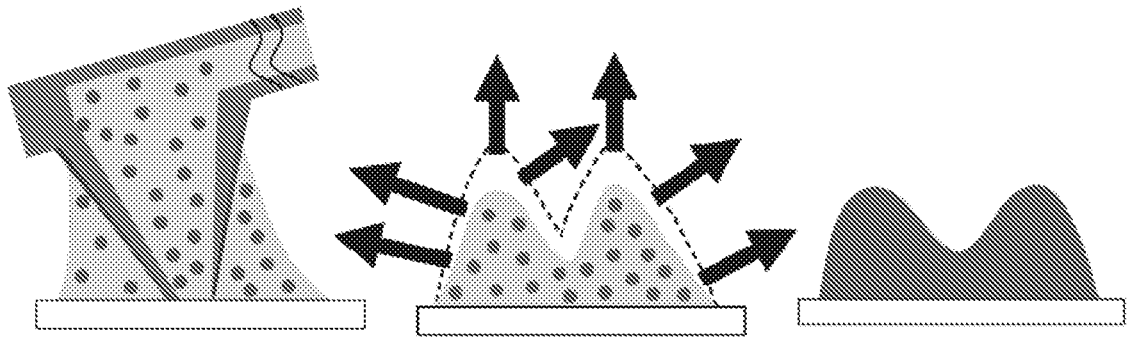
FIG. 5A illustrates the controlled assembly of a volcano-shaped structure in accordance with the disclosed embodiments.
Figure 5B:
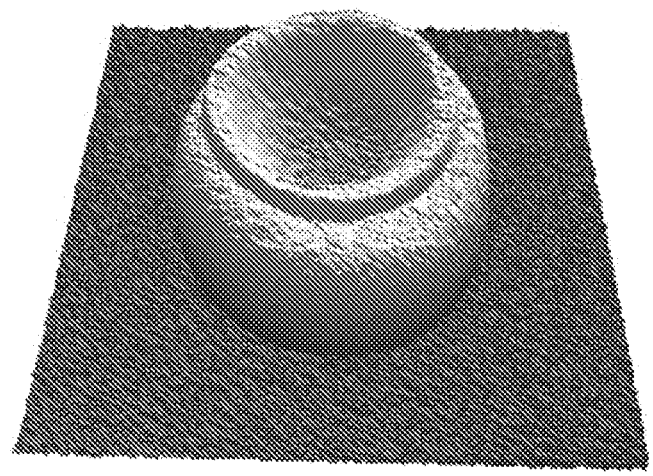
FIG. 5B presents an AFM topographic image of the volcano-shaped structure in accordance with the disclosed embodiments.
Figure 6A:
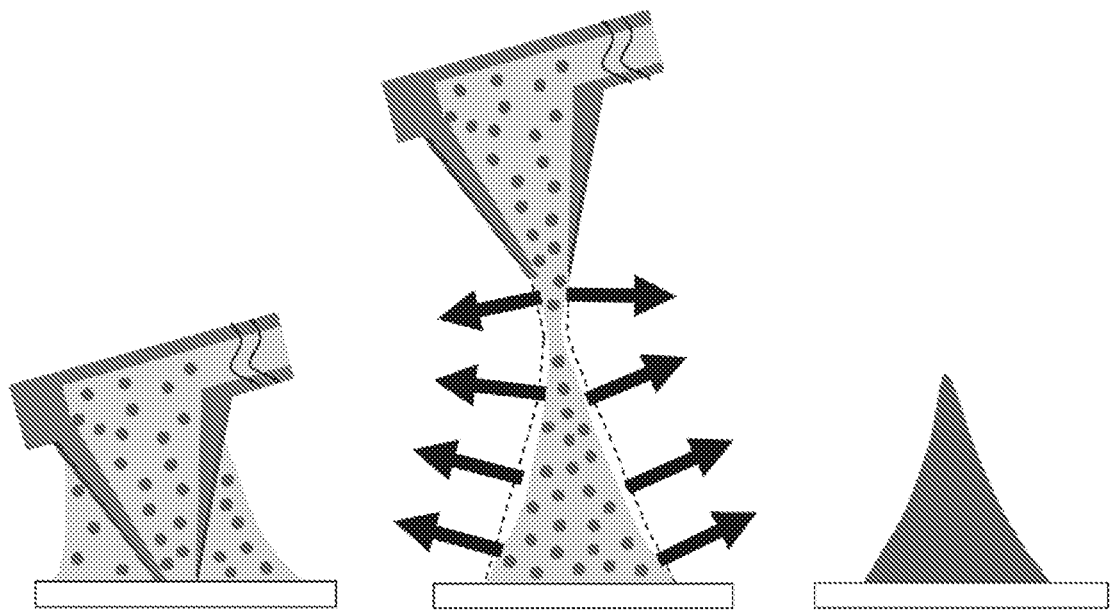
FIG. 6A illustrates the controlled assembly process for a teepee-shaped structure in accordance with the disclosed embodiments.
Figure 6B:
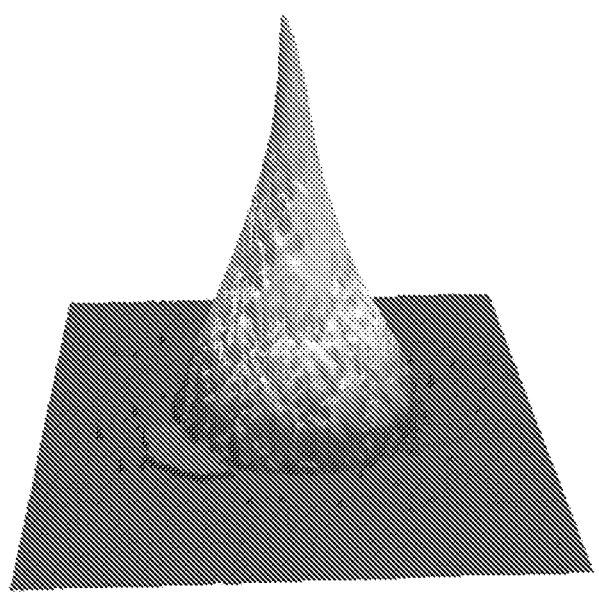
FIG. 6B presents an AFM topographic image of the volcano-shaped structure in accordance with the disclosed embodiments.
Figure 7A:
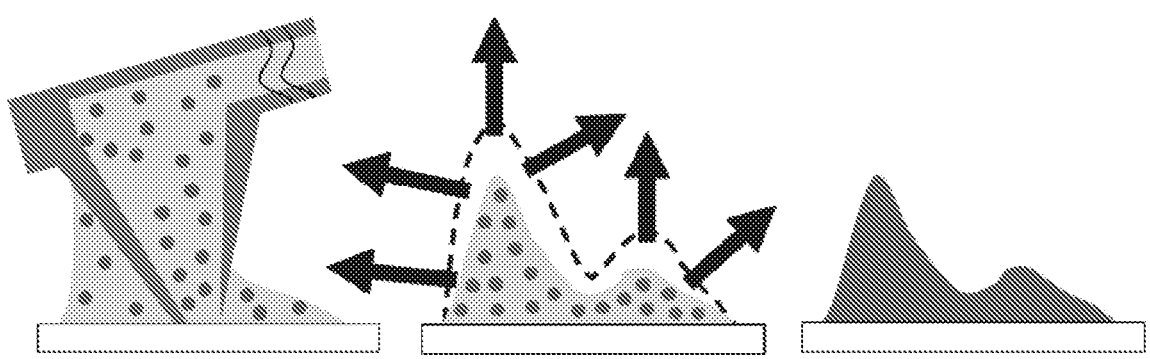
FIG. 7A illustrates the controlled assembly process for an asymmetric structure in accordance with the disclosed embodiments.
Figure 7B:
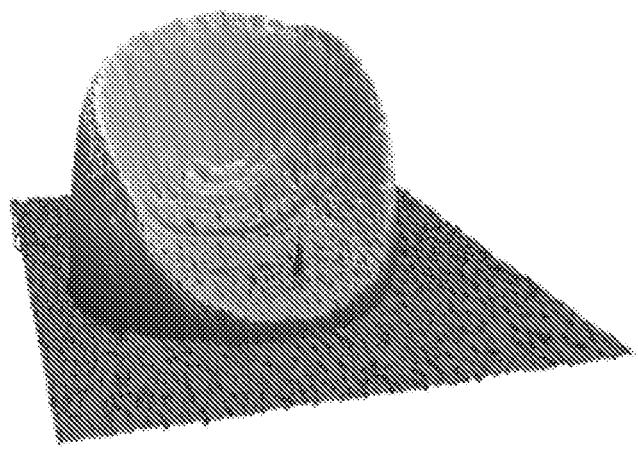
FIG. 7B presents an AFM topographic image of a bean-bag-chair-shaped structure in accordance with the disclosed embodiments.

We now provide a number of examples of the controlled assembly process. FIG. 5A illustrates the controlled assembly process for a volcano-shaped structure in accordance with the disclosed embodiments. In particular, the left-hand side of FIG. 5A illustrates the probe dispensing a droplet, the middle of FIG. 5A illustrates the droplet immediately after probe withdrawal, and the left-hand side of FIG. 5A illustrates the final assembly after solvent evaporation. The broken line and array arrows represent initial droplet boundary, and evaporation direction and rate, respectively. Note that constant-contact-area evaporation occurred in this example. FIG. 5B illustrates the resulting feature, wherein the z-scale has been exaggerated to facilitate clear visualization of the feature geometry. Similarly, FIGS. 6A and 6B illustrate the controlled assembly process and resulting feature for a teepee-shaped structure. FIGS. 7A and 7B illustrate the controlled assembly process and resulting feature for an asymmetric bean-bag-chair-shaped structure.

Controlled Molecular Assembly Process

Figure 8:
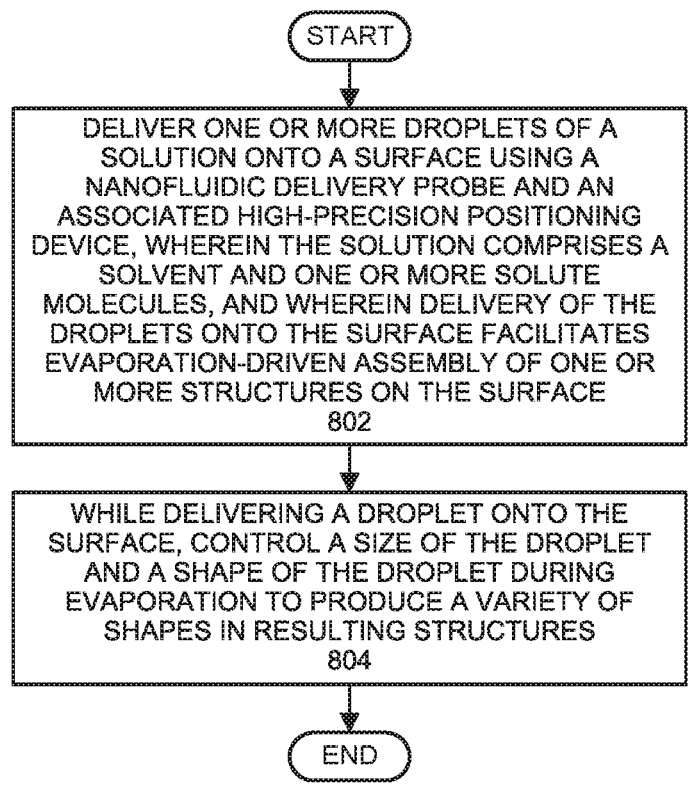
FIG. 8 presents a flow chart illustrating the controlled molecular assembly process in accordance with the disclosed embodiments.

FIG. 8 presents a flow chart illustrating the controlled molecular assembly process in accordance with the disclosed embodiments. During operation, the system delivers one or more droplets of a fluid onto a surface using a nanofluidic delivery probe and an associated high-precision positioning device, wherein the solution comprises a solvent and one or more solute molecules, and wherein delivery of the droplets onto the surface facilitates evaporation-driven assembly of one or more structures on the surface (step 802). While delivering a droplet onto the surface, the system controls a size of the droplet and a shape of the droplet during evaporation to produce a variety of shapes in resulting structures (step 804).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for performing molecular assembly, comprising:
    delivering one or more droplets of a solution onto a surface using a nanofluidic delivery probe without electrohydrodynamic action;
    wherein the solution comprises a solvent and one or more solute molecules;
    and
    wherein while delivering each droplet, the probe controls a size of the droplet and a shape of the droplet during evaporation, by controlling two or more of:
        a location of the delivery probe with respect to a middle of the droplet during said delivery;
        a contact time for the delivery probe in the droplet during said delivery; and
        a speed at which the delivery probe is withdrawn from the droplet during said delivery.

2. The method of claim 1, wherein the one or more droplets comprise sub-femtoliter droplets.

3. The method of claim 1, wherein controlling the size and the shape of the droplet further involves controlling one or more of the following:
    a contact angle between the probe and the droplet;
    a delivery pressure for the droplet;
    a delivery time for the droplet;
    an evaporation time for the droplet;
    a surface functionality of the surface;
    a surface functionality of the delivery probe;

a contact force for the delivery probe;
a concentration of the solute;
an ambient humidity; and
an ambient temperature.

4. The method of claim 1, wherein delivering the one or more droplets involves performing a three-dimensional (3D) nanoprinting process, wherein the solution is dispensed layer-by-layer following designed trajectories for each layer to form one or more three-dimensional structures.

5. The method of claim 1, wherein the nanofluidic delivery probe is part of a two-dimensional array of nanofluidic delivery probes, which can perform molecular assembly operations in parallel.

6. The method of claim 1, wherein the nanofluidic delivery probe is connected to a reservoir containing the solution, and a pressure-control mechanism.

7. The method of claim 1, wherein the nanofluidic delivery probe has an opening diameter from 5 nm to 10 μm.

8. The method of claim 1, wherein the solution includes one or more of the following: polyelectrolytes, organic molecules, inorganic molecules, and nanoparticles having a diameter from 1-100 nm.

9. The method of claim 1, wherein the surface is a solventphilic surface.

10. The method of claim 1, wherein the surface is a solventphobic surface.

11. The method of claim 1, wherein the one or more structures include one or more of the following:
a disc;
a multi-layer disc;
a mound;
an asymmetric hollow structure;
a symmetric hollow structure; and
a structure with a designed geometry.

12. The method of claim 1, wherein the one or more structures are 10 μm or smaller.

13. A method for performing molecular assembly, comprising:
delivering one or more droplets of a solution onto a surface using a nanofluidic delivery probe;
wherein the solution comprises a solvent and one or more solute molecules;
wherein delivery of the one or more droplets onto the surface facilitates evaporation-driven assembly of one or more structures on the surface;
wherein while delivering a droplet, the method controls a size of the droplet and a shape of the droplet during evaporation;
wherein the solute is comprised of one or more polymers, including a star polymer [(polystyrene)$_{34}$-(poly(N,N-dimethylaminoethylmethacrylate)$_{40}$]$_{39}$; and
wherein the solvent is a mixture of water, ethanol, and glycerol.

14. A system for performing molecular assembly, comprising:
an atomic force microscope (AFM);
a nanofluidic delivery probe; and
a controller, which is configured to control the AFM and associated nanofluidic delivery probe;
wherein the system is configured to deliver one or more droplets of a solution onto a surface without electrohydrodynamic action, wherein the solution comprises a solvent and one or more solute molecules, and wherein delivery of the one or more droplets onto the surface facilitates evaporation-driven assembly of one or more structures on the surface; and
wherein while delivering each droplet, the system is configured to control a size of the droplet and a shape of the droplet during evaporation, by controlling one or more of:
a contact angle between the probe and the droplet;
a delivery pressure for the droplet; and
a delivery time for the droplet.

15. The system of claim 14, wherein the one or more droplets comprise sub-femtoliter droplets.

16. The system of claim 14, wherein while controlling the shape of the droplet, the system is further configured to control one or more of the following during the droplet-delivery process:
a location of the delivery probe with respect to a middle of the droplet;
a contact time for the delivery probe in the droplet; and
a speed at which the delivery probe is withdrawn from the droplet.

17. The system of claim 14, wherein while controlling the size and the shape of the droplet, the system is further configured to control one or more of the following:
an evaporation time for the droplet;
a surface functionality of the surface;
a surface functionality of the delivery probe;
a contact force for the delivery probe;
a concentration of the solute;
an ambient humidity; and
an ambient temperature.

18. The system of claim 14, wherein delivering the one or more droplets involves performing a three-dimensional (3D) nanoprinting process, wherein the solution is dispensed layer-by-layer following designed trajectories for each layer to form one or more three-dimensional structures.

19. The system of claim 14, wherein the nanofluidic delivery probe is part of a two-dimensional array of nanofluidic delivery probes, which can perform molecular assembly operations in parallel.

20. The system of claim 14, wherein the nanofluidic delivery probe is connected to a reservoir containing the solution, and a pressure-control mechanism.

21. The system of claim 14, wherein the nanofluidic delivery probe has an opening diameter from 5 nm to 10 μm.

22. The system of claim 14,
wherein the solute is comprised of one or more polymers, including a star polymer [(polystyrene)$_{34}$-(poly(N,N-dimethylaminoethylmethacrylate)$_{40}$]$_{39}$; and
wherein the solvent is a mixture of water, ethanol, and glycerol.

23. The system of claim 14, wherein the solution includes one or more of the following: polyelectrolytes, organic molecules, inorganic molecules, and nanoparticles having a diameter from 1-100 nm.

24. The system of claim 14, wherein the surface is a solventphilic surface.

25. The system of claim 14, wherein the surface is a solventphobic surface.

26. The system of claim 14, wherein the one or more structures include one or more of the following:
a disc;
a multi-layer disc;
a mound;
an asymmetric hollow structure;
a symmetric hollow structure; and
a structure with a designed geometry.

27. The system of claim 14, wherein the one or more structures are 10 µm or smaller.

* * * * *